Figure 1:
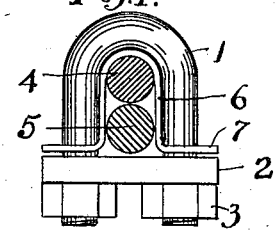

July 3, 1923.

J. B. WOODBURY ET AL 1,460,633

ROPE CLAMP

Filed March 22, 1922

Inventors:
John B. Woodbury
George C. Soule
by S. W. Bates Atty.

Patented July 3, 1923.

1,460,633

UNITED STATES PATENT OFFICE.

JOHN B. WOODBURY, OF SOUTH PORTLAND, AND GEORGE C. SOULE, OF PORTLAND, MAINE.

ROPE CLAMP.

Application filed March 22, 1922. Serial No. 545,847.

*To all whom it may concern:*

Be it known that we, JOHN B. WOODBURY and GEORGE C. SOULE, citizens of the United States, residing at South Portland and Portland, respectively, in the county of Cumberland and State of Maine, have invented certain new and useful Improvements in a Rope Clamp, of which the following is a specification.

Our invention relates to a rope clamp designed particularly for clamping together two sections of wire rope.

The class of clamps to which our invention belongs consists of a U-shaped bolt having threaded ends with nuts engaging said ends and a base plate against which the strands of the rope are forced by the bolt.

The tension put on the U-shaped bolt by screwing it down against the base plate in engagement with the two strands of the wire rope holds the sections of rope together and imparts the necessary friction to the joint.

As these clamps are usually made, the surface against which the ropes are forced by the action of the U-bolt contains considerable area and does not distort the fibers of the rope to any considerable extent.

The upper section of rope, however, which is compressed by the bolt itself is very materially distorted, the bolt having a tendency to bite into the strands of the rope and produce a depressed portion.

The use of these clamps therefore has a very considerable wearing effect on the rope and results in a very considerable decrease of strength particularly after the clamp is removed.

Another deleterious effect which these bolts have on the rope is that they allow the rope to cross as they have no binding effect tending to hold the rope sections parallel.

The object of our invention is to increase the bearing surface of the clamp where it compresses the rope at the upper strand so that the bearing surface will be substantially equal at the top and bottom of the clamp and a further object is to hold the rope section parallel and prevent their crossing.

According to our invention, we make use of a relatively thin U-shaped bearing plate which is interposed between the rope and the U-shaped bolt to increase the bearing surface and to hold the strands of rope parallel.

This bearing plate thus prevents the bolt from coming in direct contact with the rope and distributes the bearing surface over a very considerable area, thus saving the wire rope from any considerable distortion. It also acts as a guide for holding the rope sections parallel. The bearing plate being of thin material which can easily and cheaply be stamped from cold metal, produces a very cheap construction and adds very materially to the efficiency of the rope clamp.

In the accompanying drawing, we have shown a rope clamp made according to our invention applied to a pair of rods.

Figure 2:
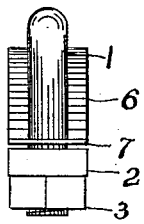
Figure 3:
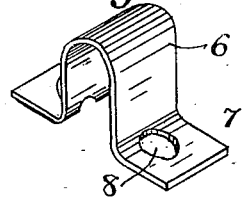

Referring to the drawing:

Fig. 1 is a side elevation of our rope clamp with the rope or rods shown in section, Fig. 2 is an elevation taken at right angles to that of Fig. 1, and Fig. 3 is a perspective view of the bearing plate.

Referring to the drawing, 1 indicates the U-bolt of usual construction; 2 is the base plate here shown as a rectangular steel plate which may be readily cut from flat bars and 3 shows the clamping nuts; 4 and 5 show the upper and lower ropes, sections here shown as solid rods which pass through the U-shaped bolt and are forced downwardly by the same against the base plate 2.

The base plate is designed to be corrugated to engage more or less with the strands of the rope or to indent the rods and to produce more friction therewith to prevent slipping.

The U-shaped bearing plate 6 is formed to be embraced by the U-shaped bolt and to exactly fit over the two sections of the wire ropes or rods.

The two lower ends of the U-shaped bearing plate are bent outward to form flanges 7 and in each flange is an opening 8 through which the ends of the U-shaped bolt pass.

It will be seen that the pressure of the U-bolt instead of being taken directly by the rope is taken first by the bearing plate 6 and transferred to the surface of the rope.

The frictional surface of the downward acting portion of the clamp is thus greatly increased and distortion of the fibers of the rope very greatly diminished.

The addition of the bearing plate 6 is at a very small cost and very little if anything, is added by our invention to the cost of the rope clamp.

The bearing plate 6 extending as it does the entire width of the base plate holds the two sections of the rope parallel and in contact so that much more friction is produced than where the holding effect of the bolt alone is relied upon.

We claim:—

In a rope clamp, the combination of a U-shaped bolt, a base plate, a U-shaped bearing plate embraced by said bolt and bent outward at its lower ends to form retaining flanges, said base plate and flanges having openings for the passage of said bolt and tightening means for said bolt.

JOHN B. WOODBURY.
GEORGE C. SOULE.